(12) United States Patent
Tal

(10) Patent No.: US 9,907,022 B2
(45) Date of Patent: Feb. 27, 2018

(54) DETECTION OF WIDE AREA WIRELESS NETWORKS

(71) Applicant: LOGINNO LOGISTIC INNOVATION LTD, Shoham (IL)

(72) Inventor: Shachar Tal, Zichron Yaakov (IL)

(73) Assignee: LOGINNO LOGISTIC INNOVATION LTD, Shoham (IL)

( * ) Notice: Subject to any disclaimer, the term of this patent is extended or adjusted under 35 U.S.C. 154(b) by 0 days.

(21) Appl. No.: 15/308,101

(22) PCT Filed: May 4, 2015

(86) PCT No.: PCT/IB2015/053236
§ 371 (c)(1),
(2) Date: Nov. 1, 2016

(87) PCT Pub. No.: WO2015/170235
PCT Pub. Date: Nov. 12, 2015

(65) Prior Publication Data
US 2017/0048800 A1 Feb. 16, 2017

Related U.S. Application Data

(60) Provisional application No. 61/988,216, filed on May 4, 2014.

(51) Int. Cl.
*H04W 52/02* (2009.01)
*G06Q 10/08* (2012.01)
*H04W 64/00* (2009.01)

(52) U.S. Cl.
CPC .... *H04W 52/0245* (2013.01); *G06Q 10/0833* (2013.01); *H04W 52/0229* (2013.01); *H04W 64/00* (2013.01); *Y02B 60/50* (2013.01)

(58) Field of Classification Search
CPC .. G06Q 10/08–10/0833; H04W 52/02; H04W 52/0209; H04W 52/0274; H04W 52/028; H04W 52/0229; H04W 52/0245; H04W 64/00; Y02B 60/50
See application file for complete search history.

(56) References Cited

U.S. PATENT DOCUMENTS

| 6,574,266 B1 * | 6/2003 | Haartsen | H04W 48/10 370/349 |
| 7,012,520 B2 * | 3/2006 | Webb, Sr. | G06Q 10/08 340/539.1 |
| 2006/0140135 A1 * | 6/2006 | Bonta | H04L 45/04 370/254 |

(Continued)

*Primary Examiner* — Raymond Dean
(74) *Attorney, Agent, or Firm* — Dr. Hanan Farber Patent Agent Ltd.

(57) ABSTRACT

A method to track a movable asset which uses a device attachable to the movable asset, whereby the device includes a transceiver adapted to communicate over a wireless wide area network. The device operates from battery power stored in a battery attachable within the device. The device is configured to conserve the battery power and a datum which pertains to the asset is logged. While the transceiver is powered off, an ambient radio frequency signal of the wireless wide area network is monitored. Upon the ambient radio frequency signal being detected above a threshold, the transceiver associated with the available mobile network channel is powered up.

9 Claims, 9 Drawing Sheets

(56) References Cited

U.S. PATENT DOCUMENTS

2008/0219389 A1\* 9/2008 Nisbet ................... H04B 1/525
   375/348
2011/0142100 A1\* 6/2011 Farmer ................ G01S 5/0215
   375/148

\* cited by examiner

DETECTION OF WIDE AREA WIRELESS NETWORKS

BACKGROUND

1. Technical Field

The present invention relates to detection of wide area wireless networks for machine-to-machine interfaces for global applications.

2. Description of Related Art

Mobile asset management involves tracking, securing and serviceability of assets of an enterprise. The enterprise may include a supply chain of goods and/or equipment. The enterprise may provide a service such as postal service, parcel delivery, commercial airline, shipping by air and/or sea, cargo management and/or military logistics. Global mobile asset management includes managing mobile assets which frequently relocate internationally and between different parts of the world.

Mobile assets may be:

Returnable and/or reusable containers used to transport cargo such as shipping containers, parcels, shipping pallets, suitcases.

Work-in-progress of goods and finished goods which pass through a supply chain.

High value tools and apparatus which are used in technical services which require full valid certification of the technical services performed. The technical services performed may justify additional tagging for the purpose of managing the object and its availability.

Loose cargo traveling in large pieces such as packaged helicopters, high output electricity generators, big parts of even bigger machines, chimneys for a factory etc.

Vehicles including unmanned vehicles such as ships, planes, cars, trucks or rails.

Any other objects of value that move globally and justifies tagging for the purpose of managing the objects.

Global mobile asset management may done via a tag, which is affixed to the asset which requires tracking and monitoring.

Presently, shipping containers are used to transport goods all over the world. There are millions of shipping containers in use today, and they typically transport billions of dollars worth of goods around the globe.

Reference is now made to FIG. 1 which shows a line drawing of a rectangular shipping container 10, according to conventional art. Typically containers 10 are made in varying shapes, sizes and specifications in order to best transport goods or items being shipped. Beams 14 connect sides 12 to roof and floor of container 10 and provide for the mounting of access doors 18. Doors 18 are used to access the space where goods/items are stored prior to transportation. Sides 12 may be corrugated and typically the space between corrugations is used to locate a vent cover 16. Vent cover 16 is typically located in a space between corrugations to avoid damage to vent cover 16. Vent cover 16 may also be located on side 12 near to doors 18. A purpose of vent cover 16 is to cover ventilation holes 24 (not shown) which typically provide ventilation between the interior and exterior of container 10.

Reference is now made to FIG. 2 which shows a closer isometric view 20 of vent cover 16 mounted on side 12 of container 10. Vent cover 16 is attached to side 12 between protruding sections of side 12 using mechanical fasteners 22. Fasteners 22 may typically be rivets or nuts and bolts. Vent cover 16 may additionally be more hermetically attached to side 12 with a silicone sealant or gasket arrangement placed between wall 12 and vent cover 16. The silicone sealant or gasket serves to stop water (rain or sea water) for example from getting into container 10 via vent holes 24 (shown in dotted lines) in container wall 12 behind vent cover 16. Vent holes 24 are through-holes in side 12 which provide ventilation and/or pressure equalization between the interior and exterior of container 10. Holes 24 may be covered with a gauze filter, semi-breathable membrane or restricted to a certain size. Holes 24 allow the escape of any gases built up inside container 10 as well as to regulate temperature or humidity inside container 10 for example. Vent cover 16 typically provides additional protection of contents inside container 10 from the environment outside container 10. Vent cover 16 may also have ventilation slots 26 at the bottom of vent cover 16 to allow air flow to and from holes 24.

U.S. Pat. No. 8,797,161 of the present applicant/assignee discloses a vent cover for installing on a shipping container. A direct current (DC) power source is encased or enclosed in the housing of the vent cover. The vent cover may include a circuit board attached to the DC power source and a wide area network transceiver. The circuit board may also include a satellite antenna interface for a satellite antenna and a global positioning system (GPS) module attached to the satellite antenna interface. The vent cover may include an environmental sensor for sensing a parameter of the shipping container.

BRIEF SUMMARY

Various methods are provided herein for tracking a movable asset which uses a device attachable to the movable asset. The device includes a transceiver adapted to communicate over a wireless wide area network. The device operates from battery power stored in a battery attachable within the device. The device is configured to conserve the battery power and a datum which pertains to the asset is logged. While the transceiver is powered off, an ambient radio frequency signal of the wireless wide area network is monitored. Upon the ambient radio frequency signal being detected above a threshold, the transceiver associated with the available mobile network channel/band is powered up. A logged datum is uploaded by the transceiver. Upon the upload being complete, the transceiver is powered off in order to conserve the battery power.

The transceiver may be operated by use of the available mobile network channel/band in one part of the world. The transceiver or a different transceiver may be powered up in a different part of the world using a different mobile network channel/band available in the different part of the world.

An ambient radio frequency signal of mobile network channel/band may be monitored by: (i) a scan over discrete mobile networking channels or (ii) a split of a signal from an antenna into multiple signal portions and the portions are filtered individually by multiple filters.

A parameter which pertains to the asset may be sensed by a sensor attached to the device. The logged datum includes the sensed parameter of the asset. The sensor may be a thermometer, a passive infra-red sensor, an intrusion detector, an accelerometer or a microphone.

A global position from a global positioning system (GPS) space-based satellite navigation system may be received. An ambient radio frequency signal strength may be monitored starting first with a mobile network channel responsive to the global location provided by the GPS space-based satellite navigation system.

Various devices attachable to a movable asset to track the asset are provided herein. The device operates on battery power stored in a battery which is attachable within the device. The device includes a transceiver adapted to communicate with a wireless wide area network. The device is configured to conserve the battery power. The device includes data storage configured to store a datum which pertains to the movable asset. A monitoring unit configured to select an available mobile network channel based on an ambient radio frequency signal being above a threshold while the transceiver is powered off. The transceiver may be (i) powered up when the wireless wide area network is available, (ii) upload the stored datum and upon completion of the upload is (iii) powered off in order to conserve the battery power.

The device may further include a sensor configured to sense a status of the asset. The sensor may be a thermometer, a passive infra-red sensor, an intrusion detector, an accelerometer or a microphone. The datum may be a sensed datum provided by the sensor. A global positioning system (GPS) space-based satellite navigation receiver configured to provide a location of the device, wherein the selection of the wireless wide area network is responsive to the location. The monitoring unit may be connectable to an antenna and may include either a frequency programmable radio frequency filter or an RF splitter of a signal from an antenna into multiple signal portions and the portions are filtered individually by multiple RF filters. The monitoring unit may be powered to select the available mobile network channel/band while the transceiver is powered off.

BRIEF DESCRIPTION OF THE DRAWINGS

The invention is herein described, by way of example only, with reference to the accompanying drawings, wherein.

DETAILED DESCRIPTION

Figure 1:
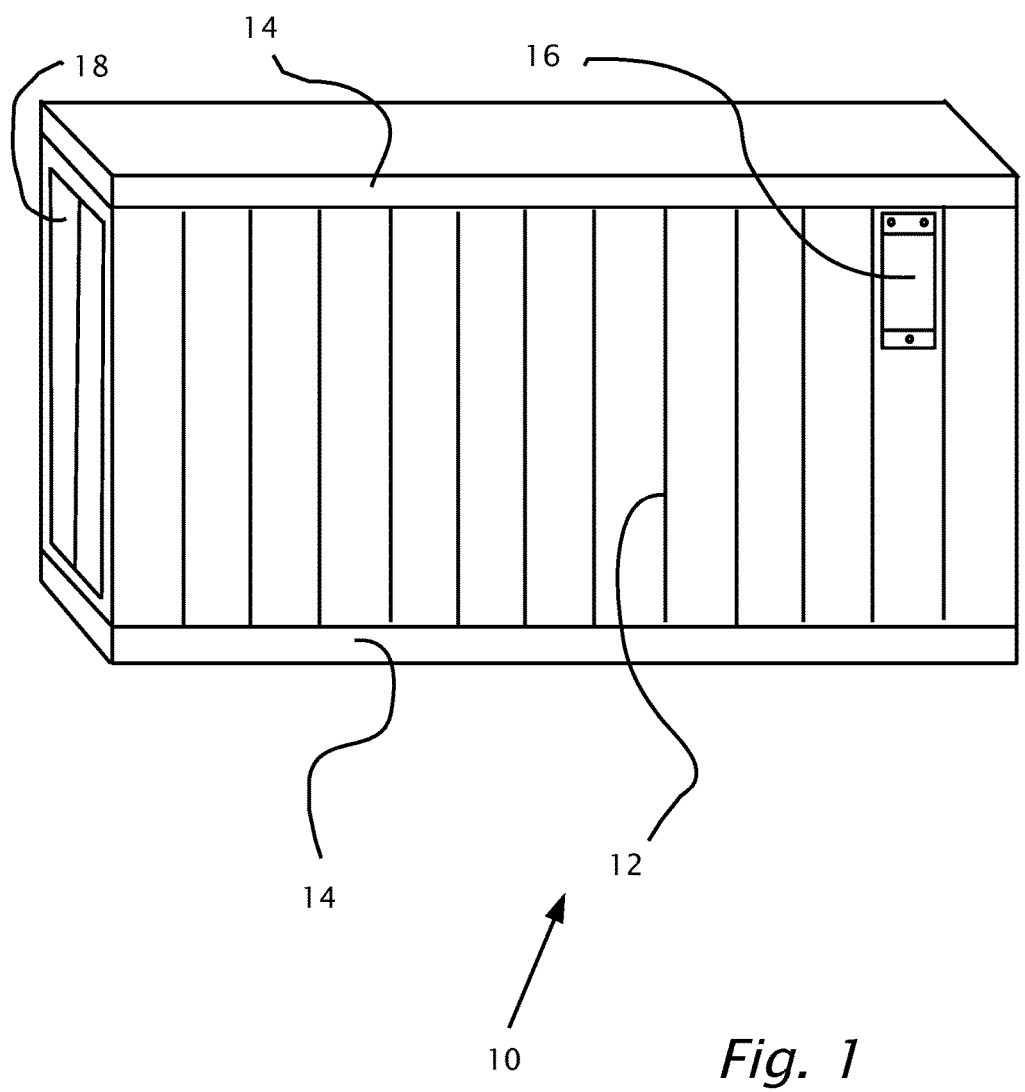
FIG. 1 shows a rectangular shipping container, according to conventional art.
Figure 2:
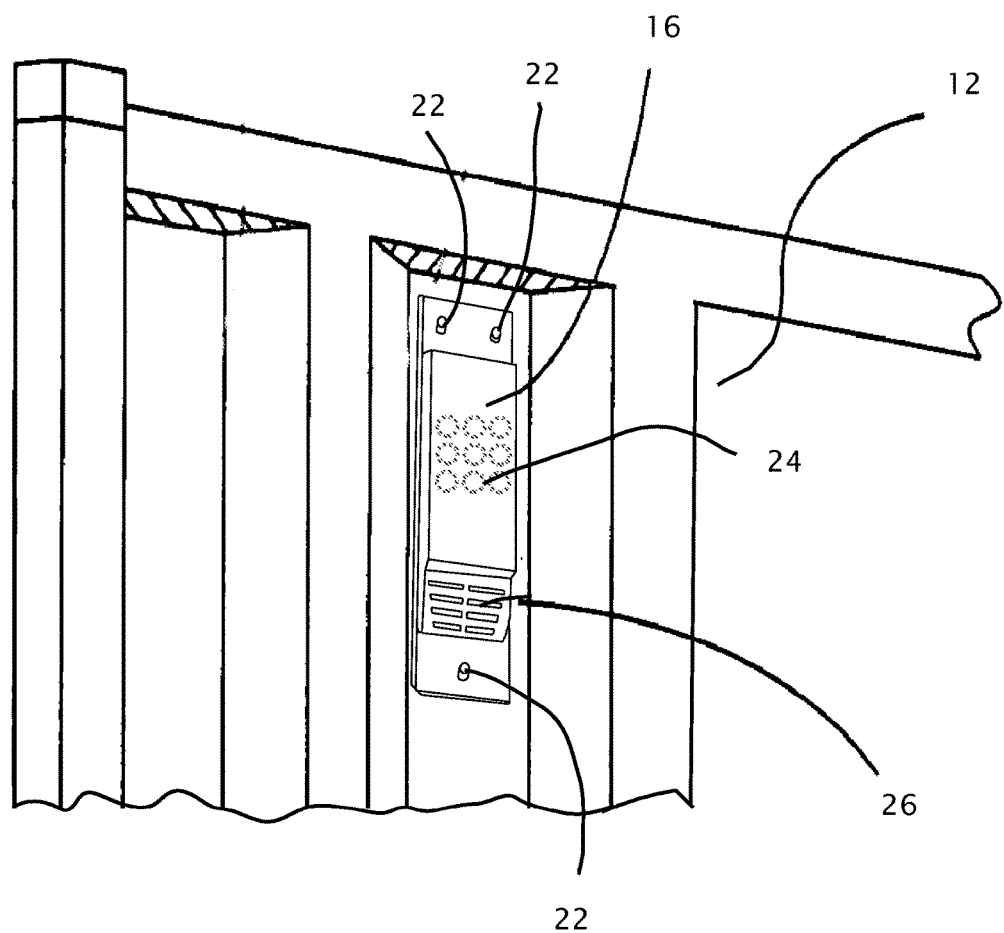
FIG. 2 shows a closer isometric view of vent cover mounted on the side of the shipping container of FIG. 1, according to conventional art.

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are directed to machine-to-machine (M2M) applications and battery powered mobile devices or tags attached to assets for global mobile asset management where the biggest energy consumer in the mobile devices is a radio frequency (RF) transceiver. Different embodiments of the present invention are directed to prevent transceiver(s) from powering up when not needed whilst mobile assets are being tracked/secured by the mobile devices. A transceiver is not needed when for example there is no available network.

Currently, global network transceivers may or not be within reception of a network which may be used for communications. In prior art systems, different transceivers or transceiver channels may be successively attempted to check for availability of a network/mobile channel, and turned off when availability is not found.

An example of a prior art method for acquiring a cellular network:

1. Transceiver is powered on by a control unit.
2. Transceiver is configured by the control unit with its operating parameters.
3. Under control of the control unit, the transceiver attempts to connect to the first mobile channel or set of mobile channels.
4. If a response from a relevant network is not forthcoming within a specified time (usually about a minute or so), then under control of the control unit, the transceiver tries to connect to the next mobile channel.
5. If a response from a relevant network is forthcoming, then the controller tries to register to that network.
6. If all available mobile channels are attempted without receiving a response from a relevant network, then the control unit stops the search.

Global System for Mobile Communications (GSM), is a standard developed by the European Telecommunications Standards Institute (ETSI) to describe protocols for second and higher digital cellular networks used by mobile phones as an example. GSM networks include multiple "sets" of frequencies which may differ from country to country. Using GSM as an example, given the numerous multiple frequencies or mobile channels, GSM cellular transceivers normally attempt to connect during a long time period of several minutes before acquiring a network, or for an operating system/algorithm to determine that there is no available network. Transceivers under control of a control unit normally search for network frequencies one by one which is a method inherited from voice applications such as global roaming.

In embodiments of the present invention it is understood that each network has a radio frequency signature by use of specific frequencies, bandwidths and/or energy distribution in a band. A radio frequency scan, according to a feature of the present invention, of known networks may determine if there is a possibility for a signal usable for communications. Such a scan avoids powering up one or more transceivers to acquire available networks and provides a device with a considerable savings in time and energy over current devices/methods available. For a device running on battery power, a considerable savings in battery power results which allows the device to remain in place without recharge/battery replacement for a long period of time, which may extend to months or years as the movable asset, e.g. shipping container, is transported globally from port to port.

Another important benefit of the present invention relates to real time alerts. A sensor connected to the device may detect a condition which may require immediate reporting. A high temperature in a shipping container may indicate a fire or cooling system failure requiring immediate attention. If the mobile network transceiver is powered down in order to conserve battery power then several minutes would be required using prior art systems/methods to acquire a network even if a network is available. One of the intentions of the present invention in certain embodiments is to reduce the time (to seconds) between sensing an alert condition and transmitting an alert without having the transceiver(s) always powered.

While the disclosure as follows includes a detailed description of a device according to an embodiment of the present invention installed on a shipping container as an example of a movable asset being tracked/secured/monitored, the invention as claimed may be applied equally to other types of movable assets. For example, a device according to different embodiments of the present invention may be installed on or inside a shipping crate pallet to track/secure the shipping crate. According to a different embodiment of the present invention, a device may be attached to the closure of a shipping or postal bag to track and/or secure the postal bag.

In a different embodiment, the present invention may be applied to mobile computer systems such as smart-phones, portable and/or mobile computers such as laptop computers, net-book computers and/or tablets which are enabled to communicate over a wireless wide area network. Application of the present invention will result is a considerable reduction in time to acquire a network in addition to saving battery power.

Figure 3:
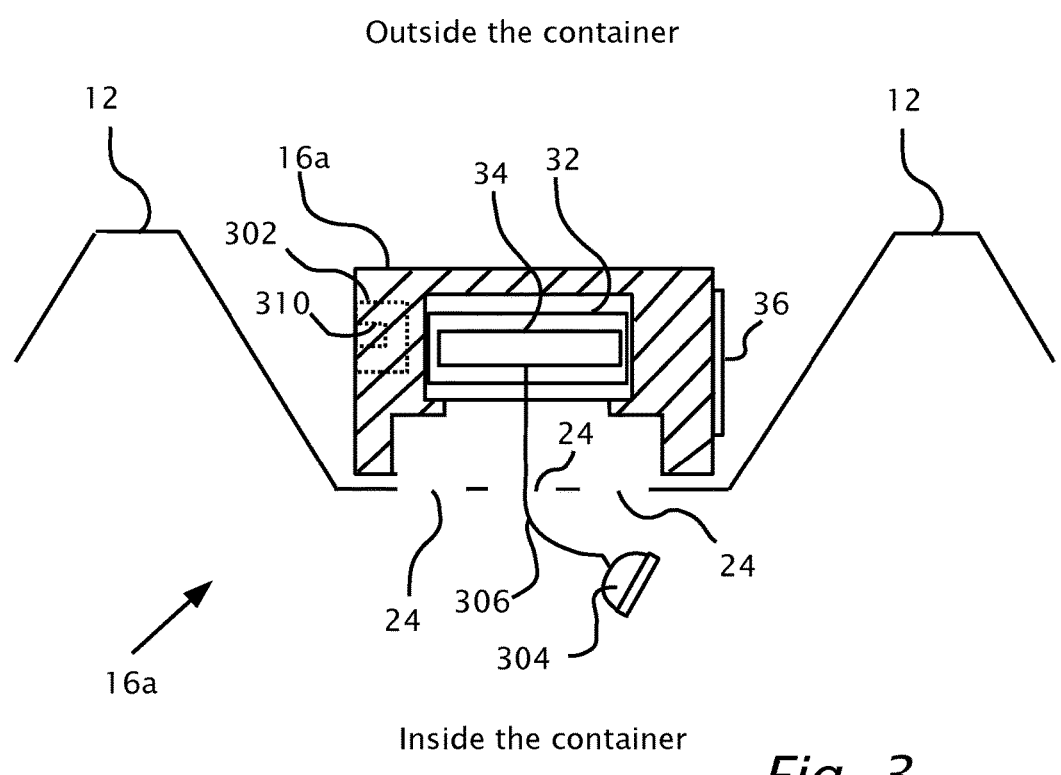
FIG. 3 shows a cross-sectional detail of a housing including a device according to an embodiment of the present invention

Reference is now made to FIG. 3 which shows a cross-sectional detail of a housing 16a including a device according to an embodiment of the present invention. Housing 16a is shown attached to flat surface of wall 12 between corrugated sections of wall 12 and mounted on the outside of a shipping container 10. A sensor 304, e.g. passive infra red PIR sensor, is located on the inside of container 10 and is attached to circuit board 34 with cable 306. Cable 306 connects board 34 to sensor 304 through ventilation hole 24. Multiple ventilation holes 24 may allow for multiple sensors, transducers or antennas to be located inside container 10 which may be connected to circuit board 34. Multiple sensors, transducers or antennas may be located inside container 10 typically may allow for sensing of temperature, humidity, pressure, air quality, motion, along with the removal and placement of objects inside container 10.

Antenna 36 is connected to circuit board 34 and may be disposed on the inside of housing 16a (along with board 34 and battery holder 32) if housing 16a is made from an electrically non-conductive material. If housing 16a is made from electrically conductive material such as metal, antenna 36 may be mounted outside the exterior surface of housing 16a. Antenna 36 is typically located and oriented to allow for either vertical and/or horizontal polarization. Antenna 36 is shown externally on a vertical face of housing 36 by way of example only. One or more antennas 36 may be placed on other external faces of housing 16, disposed internally within housing 36 and/or as part of circuit board 34.

Circuit board 34, battery holder 32 and/or batteries (not shown) may be cast inside of housing 16a as part of the manufacturing process, e.g. injection molding, of housing 16a. The manufacturing process, may include use of either thermoplastic or thermoset, e.g. epoxy, urethane materials. Alternatively battery holder 32 and/or circuit board 34 may be mounted inside of housing 16a using conventional attachment means known in the art subsequent to injection molding.

A mutual inductive coupling 302, on the inside of housing 16a, may be used for charging re-chargeable batteries. Coupling 302 may have an aperture 310 which provides a mutual inductive coupling to a secondary magnetic core. Mutual inductive coupling 302 has a secondary winding which is wound around the secondary magnetic core. The secondary winding provides a low voltage alternating current (AC) output when a primary magnetic core (with a primary winding connected to mains electricity) is inserted into the aperture 310 of coupling 302. The low voltage AC output of the secondary winding is rectified to provide a direct current (DC) used for charging batteries in battery holder 32 when batteries are re-chargeable. Batteries in battery holder 32 may need to be re-charged or replaced prior to the shipping and delivery of a container 10. When the batteries in battery holder 32 are replaced, typically when container 10 is being reloaded, housing 16a is removed from the side of container 10 by unfastening fasteners 22, the batteries in battery holder 32 are replaced and housing 16a is re-attached to container 10 using fasteners 22. Alternatively, batteries may be recharged using kinetic charging, inductive charging, RF charging, solar and/or wind power from an external power generation device, e.g. solar panel, wind turbine.

Figure 4:
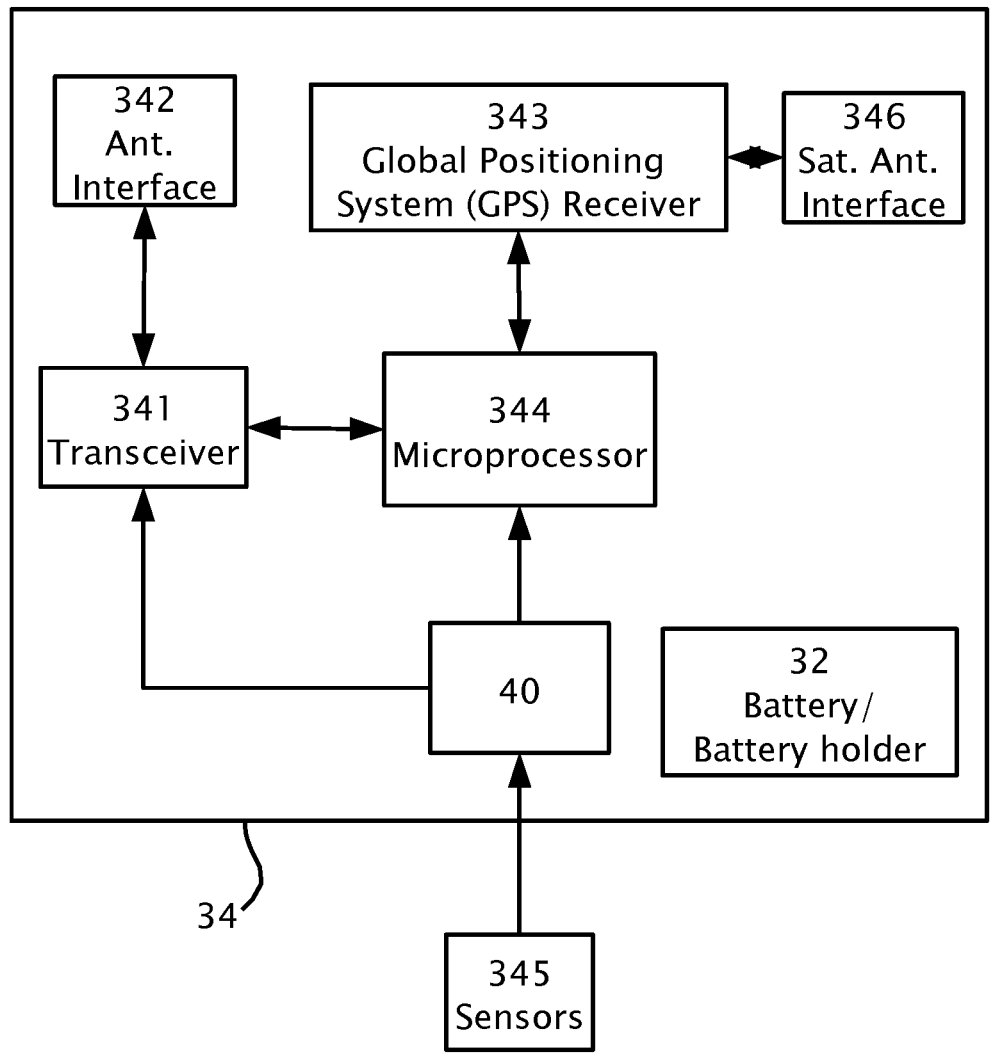
FIG. 4 shows a block diagram of a device, according to features of the present invention.

Reference is now also made to FIG. 4 which shows further details of circuit board 34 according to an aspect of the present invention. Circuit board 34 is powered by batteries placed in battery holder 32. Circuit board 34 includes an antenna interface 342 which allows one or multiple antennas 36 to be connected to one or more transmitters, receivers and/or transceivers. A single transceiver 341 and a single antenna interface 342 is shown, by way of example. Transceiver 341 may be one of multiple transceivers (not shown) Transceiver 341 may be a satellite transceiver, or another transceiver operating with another wireless wide area network.

An example of transceiver 341 is implemented in a single-chip such as GE864-QUAD V2 Telit range of products of Telit Wireless Solutions (Global Headquarters Telit Communications PLC—7th Floor, 90 High Holborn, London WC1V 6XX, UK).

Optionally, a satellite receiver 343 for global positioning system (GPS) may be attached to a port 346 for a satellite antenna externally mounted in or outside housing 16a. Both satellite receiver 343 and transceiver 341 are operatively connected to a processor 344 (with memory built in and/or attached thereto). A circuit 40 is connected between processor 344 and sensor interface 345. An output of circuit 40 may connect to transceiver 341. Sensor interface 345 allows data to be sent and received from one or multiple sensors 304 (FIG. 3) located inside container 10. The data are typically processed by processor 344 and/or a processor of circuit 40. Interface 345 typically may provide the function of sample and hold and appropriate analogue to digital (A/D) and digital to analogue (D/A) conversion of data sent and received between processor 344 and one or more sensors located inside container 10 and/or on circuit board 34. Sensors may be passive infrared (PIR) sensor, a thermometer, an accelerometer sensor, proximity/intrusion detector and a microphone.

Figure 5:
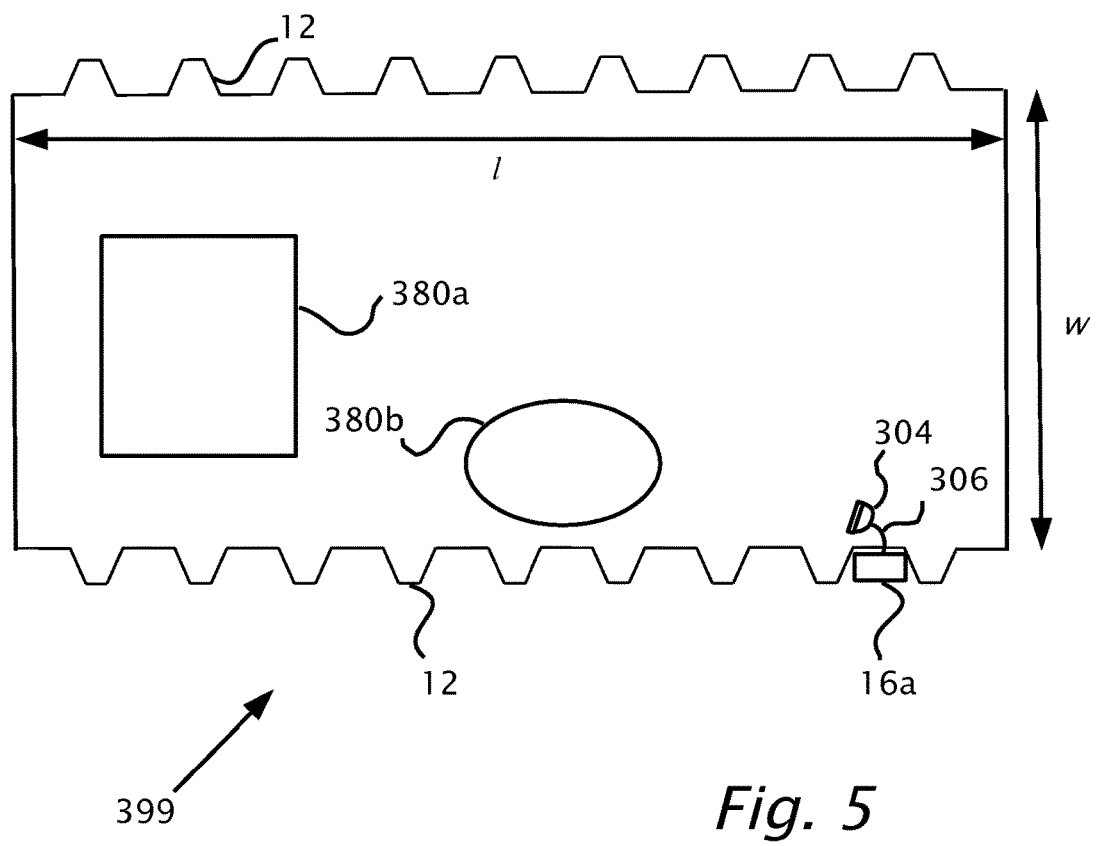
FIG. 5 shows a cross sectional plan view of rectangular container being tracked by a device according to a feature of the present invention.

Reference is now also made to FIG. 5 which shows a cross sectional plan view 399 of rectangular container 10, items inside container 10 which are to be shipped are shown as items 380a and 380b. Sensor 304 is typically located near a corner of container 10 and is connected to housing 16a using an optional cable 306 through one of vent holes 24 (not shown). Alternatively, sensor 304 may be mounted directly on circuit board 34. Sensor 304 connected to processor 344 may be used to detect movement of objects 380a, 380b. Sensor 304 typically senses changes inside container 10.

Figure 6:
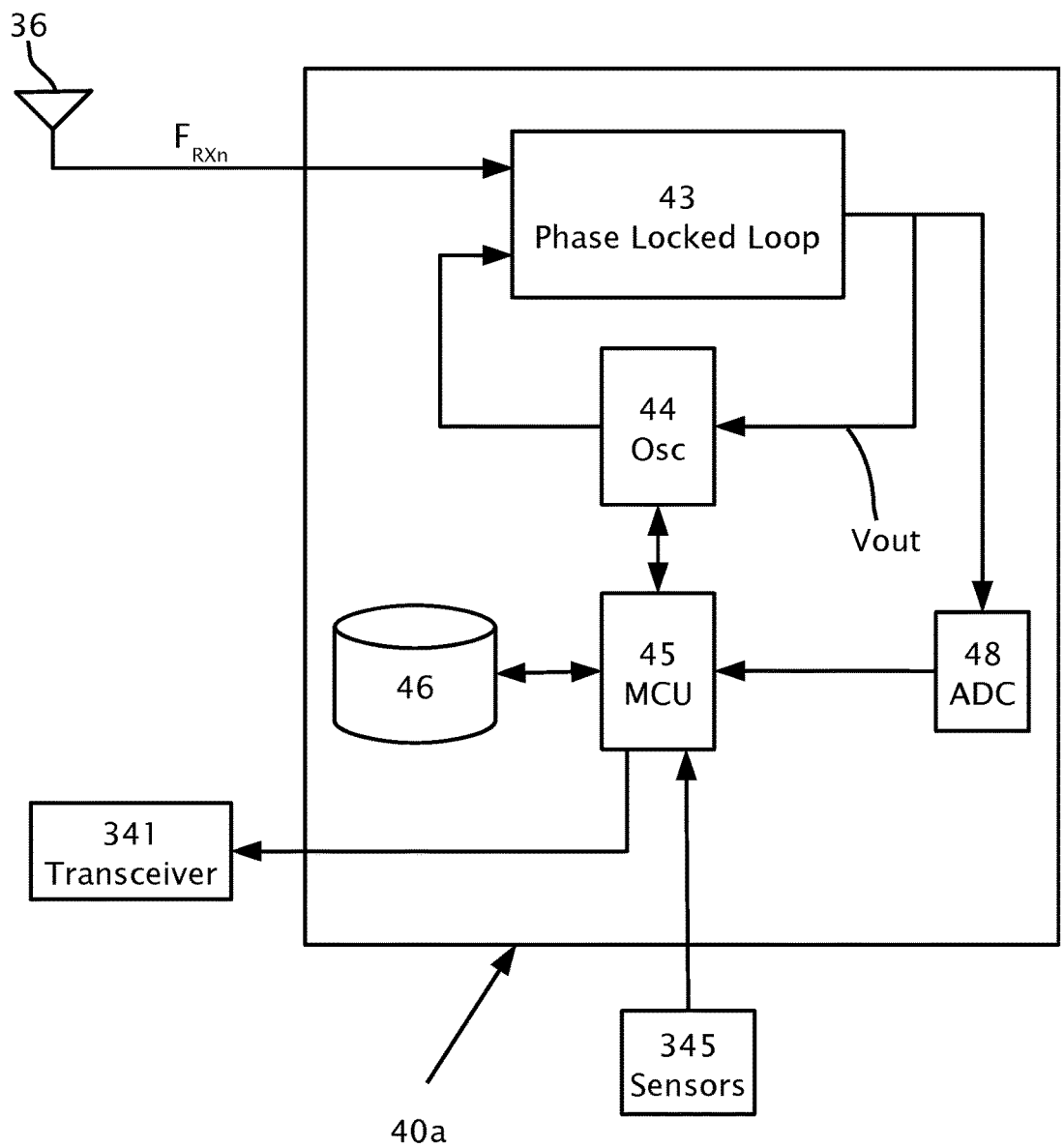
FIG. 6 shows a block diagram of an RF signal monitoring circuit (Figure according to a feature of the present invention.
Figure 7:
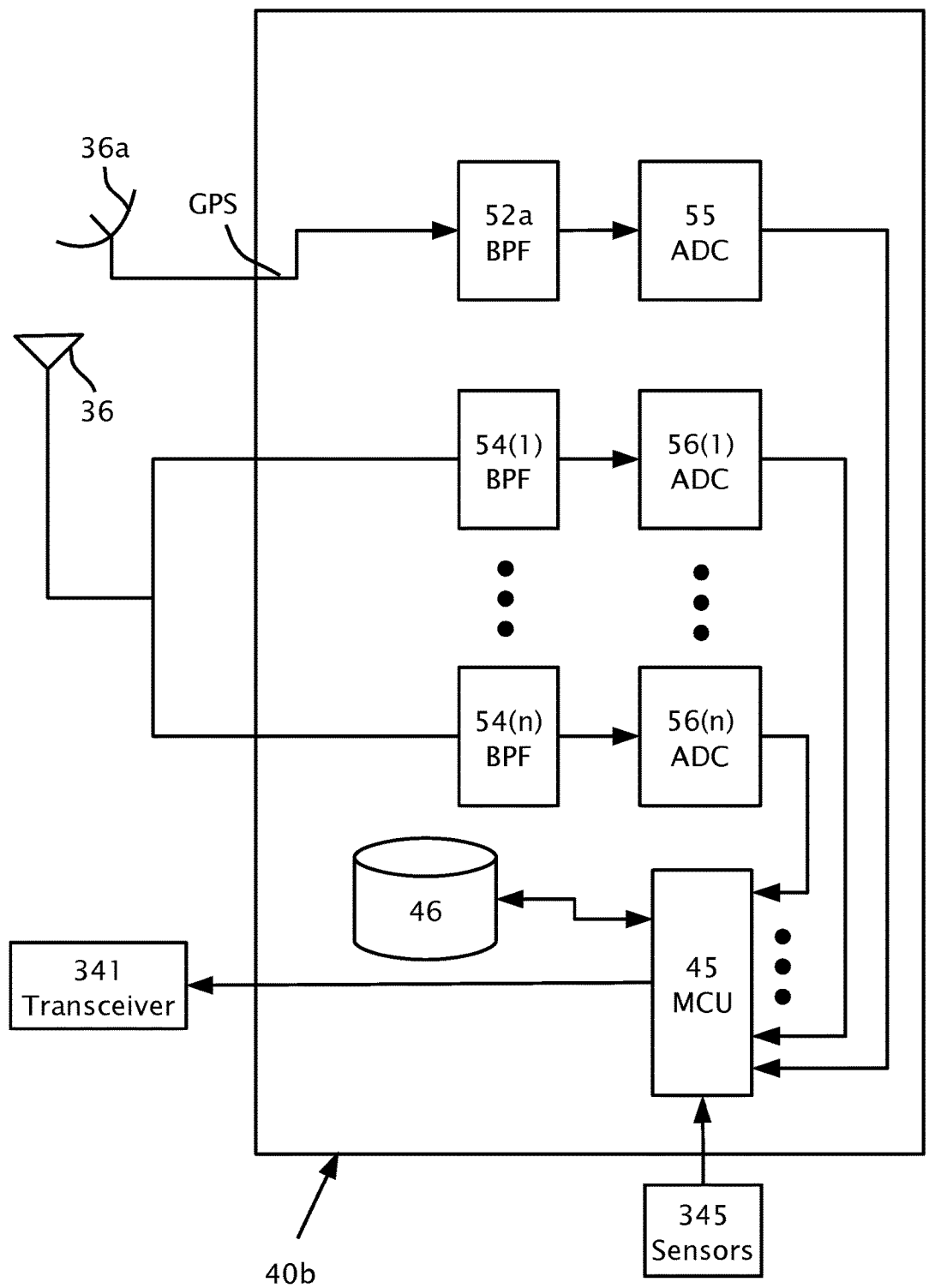
FIG. 7 shows an alternative block diagram of an RF signal monitoring circuit according to a feature of the present invention.

Reference is now made to FIGS. 6 and 7 which show alternative block diagrams 40a and 40b of circuit 40 (FIG. 4), according to different embodiments of the present invention. Common to both FIGS. 6 and 7 is micro-control unit (MCU) 45 which receives an input from sensors 345, when sensors 345 sense a parameter above a certain threshold. When sensors 345 sense a parameter above a certain threshold, MCU 45 may be awakened from hibernation (low energy usage mode) and an algorithm in memory storage 46 attached to MCU 45 is utilized by MCU 45 to power up and operate transceiver 341 (which may be one of multiple transceivers 341) and/or GPS 343. Alternatively when sensors 345 sense a parameter above a certain threshold, MCU 45 may be utilized to power up, control and operate transceiver 341 and/or UPS 343 (shown in according to features described below.

Referring to FIG. 6 specifically, circuit 40a includes a programmable radio frequency filter incorporated into a phase locked loop (PLL) 43 which has an input signal $F_{RXn}$ from antenna 36. The input signal $F_{RXn}$ includes ambient radio frequency signals which may include any number n of ambient frequencies. Another input into PLL 43 is from the output of a controlled oscillator 44. The input to controlled oscillator 44 is from the output ($V_{out}$) of PLL 43. The output ($V_{out}$) of PLL 43 is input to analogue to digital converter (ADC) 48. The output of ADC 48 is input into MCU 45. MCU 45 connects bidirectionally to controlled oscillator 44.

PLL 43 is controlled by MCU 45 and PLL 43 generates an output signal whose phase is related to the phase of input signal $F_{RXn}$. Controlled oscillator 44, also controlled by MCU 45 generates a periodic signal. A phase detector of PLL 43 compares the phase of input signal $F_{RXn}$ with the phase of the periodic signal from the output of controlled oscillator 44 and adjusts controlled oscillator 44 to keep the phases matched. A controllable feedback loop is therefore created between the output of PLL 43 and the input of PLL 43. Typical functions of PLL 43 may include the ability to demodulate a signal, recover a signal from a noisy communication channel, or generate a stable frequency at multiples of an input frequency (frequency synthesis). According to a feature of the present invention circuit 40a is utilized to identify ambient frequencies/bands above noise of $F_{RXn}$ and if no signal of any wide area wireless network channel crosses a defined threshold, then the conclusion is that there is no relevant network, and the powering up of transceiver 341 may be avoided to save power. However, if one or more signals cross a defined threshold for $F_{RXn}$, the signal frequencies/channels may be compared against a simple look up table stored in memory storage 46 which contains the frequencies used for each type of network. If a network connection is desired, then an appropriate transceiver 341 may be set by MCU 45 to connect to specific network and/or channel so as to enable an upload of data sensed by sensors 345. After the upload, transceiver 341 along with MCU 45 may be powered down into a power saving state to wait for another sensed event by sensors 345.

Referring to FIG. 7 specifically, circuit 40b has an input from satellite antenna 36a which is fed in to the input of band-pass filter (BPF) 52a and one or inputs from a cellular antenna 36 input to band pass filters 54(1) . . . 54(n). Satellite antenna 36a typically incorporates a low-noise block downconverter (LNB). The LNB is a combination of low-noise amplifier, frequency mixer, local oscillator and IF amplifier. The LNB receives the microwave signal from the satellite collected by the dish, and down-converts and amplifies the block of frequencies to a lower block of intermediate frequencies (IF). Band pass filters 52(a) and 54(1) . . . 54(n) may be fixed passive filters which each transmit a single mobile down-link band in substantially the range of frequencies between 500 MHz and 3 GHz. The output of BPF 52(a) and 54(1) . . . 54(n) may be individually amplified (amplifiers not shown) and connected to the input of analogue to digital converters (ADCs) 55 and 56(1) . . . 56(n). Outputs of ADCs 55 and 56(1) . . . 56(n) are shown input to MCU 45.

Figure 8:
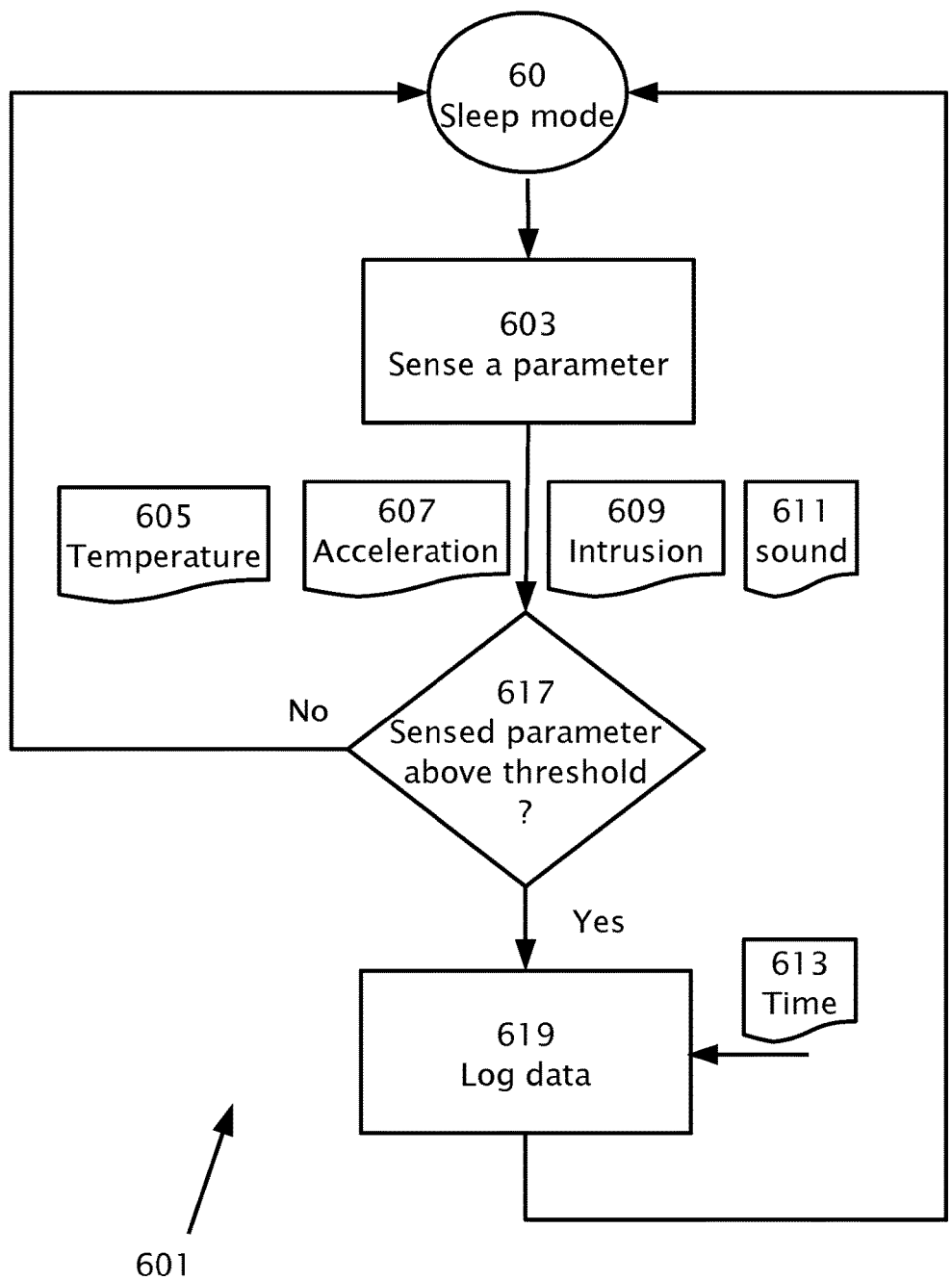
FIG. 8 shows a flow chart of a method, according to features of the present invention

Reference is now made to FIG. 8 which shows a flow chart of a method 601, according to an embodiment of the present invention. Circuit board 34 is nominally in an energy conserving sleep mode 60 in which transceivers 341 are hibernating or not powered. Sensors 345 which may be active. MCU 45 may be hibernating. In step 603, a parameter of a mobile asset, e.g shipping container 10 for example may be sensed with one or more sensors 345. The parameter sensed in step 603 may include sound 611, temperature 605, acceleration 607 and intrusion 609. Intrusion 609 may be sensed via a passive infrared sensor or a proximity sensor. A timer or clock may provide indication of an elapsed time 613 to initiate logging of data (step 619) at determined time intervals. In decision block 617, if a sensed parameter in step 603 is above a certain threshold, a data log of the sensed parameter may be logged in storage 46 (step 619). Device 34 returns to sleep mode 60 in which transceivers 341 are not powered.

Figure 9:
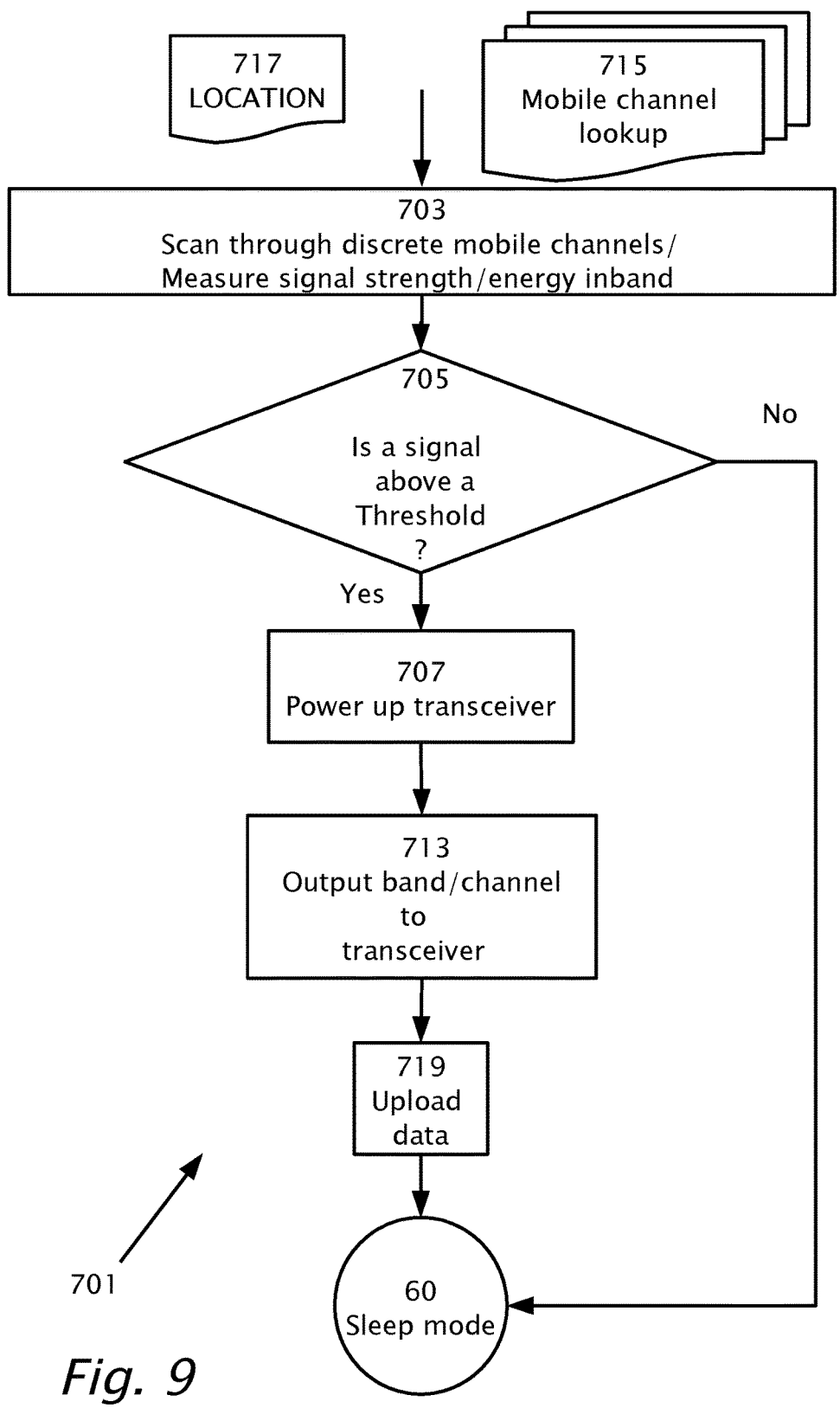
FIG. 9 shows a flow chart of a method, according to features of the present invention.

Reference is now made to FIG. 9 which shows a flow chart of a method 701, according to an embodiment of the present invention. Ambient radio frequency (RF) signal strength or in-band energy level is measured or monitored (step 703) by circuit 40 by way of example using either of circuits 40a shown in FIG. 6 or circuit 40b shown in FIG. 7. In decision block 705, if a signal in power units such as dbm (or in-band energy in joules) of a mobile band received by antennas 36 and/or 36a is above a threshold, one of transceivers 341 is powered up (step 707) via the control of MCU 45 and/or processor 344. The available mobile frequency band or channel may be output in step 713 to the appropriate transceiver 341. Transceiver 341 may be operated to upload (step 719) the 30 stored log from step 619 (FIG. 8). If the upload attempt in step 719 is successful or otherwise unsuccessful, transceivers 341 are powered down and circuit board 34 resumes a sleep state 60.

Prior to decision block 705, and optionally prior to scanning (step 703) using circuit 40a through discrete mobile channels, known frequencies and/or channels may be looked up in a stored look up table 715. Location information 717 may be available from GPS 343, and location information 717 may be used in addition to determine which mobile channel to attempt first while discretely scanning (step 703) using circuit 40a through mobile channels. Location information 717 may be based on previous history or known available networks in a particular region, e.g. port.

In sum with respect to the above, the present invention intends to add a specific logic, intended to give a quick determination of whether there is an available wire area wireless network, in order that transceiver 341 which is normally the largest consumer of battery power is operating only when a network is available.

The term "network" as used herein refers to a wide area network such as any of cellular, satellite and WiMax networks. The electromagnetic spectrum of networks such as Cellular, Satellite and GPS may by way of example include 800/850/900/1,800/1,900/2,100 MHz used by cellular networks, 1.57542 GHz (L1 signal) and 1.2276 GHz (L2 signal) used by GPS satellites, 1602 MHz+n×0.5625 MHz set of frequencies used by GLONASS satellites and various frequencies between 1.5 to 1.6 GHz may be used by satellites such as Inmarsat, for example. Examples of standard wide area networks also include: GSM, IS-95, UMTS, CDMA2000, LTE Long-Term Evolution, and HSDPA High-Speed Downlink Packet Access.

The term "signal" or "radio frequency signal" as used herein may mean RF power (in dbm for instance) or energy (in joules for instance) monitored or measured in a frequency channel or in a frequency band. An energy measurement may be more appropriate measure of "signal" for spread spectrum modulations such as in CDMA2000 networks in which RF power in a CDMA band may be integrated over time (e.g. 1-2 seconds) to determine if the in-band energy which is noise-like is sufficiently greater than the in-band noise. A measure of signal power may be more appropriate for TDMA time division multiple accessed networks such as GSM, for instance. The signal measurements (whether in terms of power or energy) herein need not be absolute or calibrated measurements of power or energy, a proportional or relative measurement is normally sufficient to perform the present invention.

The terms "modem" and "transceiver" as used herein are used interchangeably.

The term "wireless wide area network" or "wireless WAN" as used herein includes a cellular network in which separate areas of coverage or cells are connected to provide service to a large geographic area and/or a global satellite network.

The terms "wireless wide area network" and "global mobile network" are used herein interchangeably.

The terms "movable asset" and "mobile asset" are used herein interchangeably.

The term "movable asset" refers to any assets which are transported (or transport themselves) globally including (but not limited by): returnable and/or reusable containers including, parcels, shipping pallets, suitcases, cargo including loose cargo traveling in large pieces, vehicles including unmanned vehicles such as ships, planes, cars, trucks, rails and any other objects of value that move globally and for which tracking and/or securing the objects may be justified The definite articles "a" or "an" as used herein, such as "an antenna", "a datum" have the meaning of "one or more" that is "one or more antennas" or "one datum or data".

An Alternative Embodiment of the Present Invention for Use with Mobile Computer Systems In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a phone or Personal Digital Assistant "PDA") where internal modules (such as a memory and processor) work together to perform operations on electronic data. While any computer system may be mobile, the term "mobile computer system" especially includes laptop computers, net-book computers, cellular telephones, smart phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Various methods are provided herein which uses a device attachable to a mobile computer system. The device includes a transceiver adapted to communicate over a wireless wide area network. The device may operate from battery power and may be configured to conserve the battery power. Alternatively or in addition, the device may be configured to decrease the time interval required to establish a communications connection. While the transceiver is powered off, an ambient radio frequency signal of the wireless wide area network is monitored. Upon the ambient radio frequency signal being detected above a threshold, the transceiver associated with the available mobile network channel/band is powered up. When communications are complete, the transceiver may be powered off.

Various devices attachable to a mobile computer system are provided herein. The device may operate on battery power and the device may be configured to conserve the battery power. Alternatively or in addition, the device may be configured to decrease the time interval required to establish a communications connection over the wireless wide area network. The device includes a transceiver adapted to communicate with a wireless wide area network. A monitoring unit configured to select an available mobile network channel/band based on an ambient radio frequency signal being above a threshold while the transceiver is powered off. The transceiver may be (i) powered up when the wireless wide area network is available, (ii) communicate with the wireless wide area network and upon completion of the communications the transceiver is (iii) powered off in order to conserve the battery power.

Although selected embodiments of the present invention have been shown and described, it is to be understood the present invention is not limited to the described embodiments.

The invention claimed is:

1. A method for tracking a movable asset using a device attachable to the movable asset, the device includes a transceiver adapted to communicate over a plurality of wireless wide area networks, the method comprising:
   logging a datum pertaining to the asset;
   providing a global location of the device;
   while the transceiver is powered off, monitoring for an ambient radio frequency signal of the wireless wide area networks, said monitoring for an ambient radio frequency signal starting with a wireless wide area network channel responsive to the global location, wherein monitoring for an ambient radio frequency signal includes splitting a signal from an antenna into multiple signal portions and filtering the portions individually by multiple filters;
   upon detecting the ambient radio frequency signal above a threshold, selecting the wireless wide area network channel while the transceiver is powered off;
   powering up the transceiver;
   uploading by the transceiver the logged datum over the selected wireless wide area network channel;
   upon completing the upload, powering off the transceiver in order to conserve battery power.

2. The method of claim 1, further comprising:
   operating the transceiver using the available mobile network channel in one part of the world; and powering up the transceiver or a different transceiver in a different part of the world using a different mobile network channel available in the different part of the world.

3. The method of claim 1, wherein said monitoring for an ambient radio frequency signal includes scanning over discrete mobile networking channels.

4. The method of claim 1, further comprising:
   sensing a parameter pertaining to the asset by a sensor attached to the device; wherein said logged datum includes the sensed parameter of the asset.

5. The method of claim 4, wherein the sensor is selected from the group consisting of: a thermometer, a passive infra-red sensor, an intrusion detector, an accelerometer and a microphone.

6. The method of claim 1, further comprising:
   said providing the global location from a global positioning system (GPS) space-based satellite navigation system.

7. A device attachable to a movable asset to track the asset, the device comprising:
   a transceiver adapted to communicate over a plurality of wireless wide area networks;
   a global positioning system (GPS) space-based satellite navigation receiver configured to provide a global location of the device;
   data storage configured to store a datum pertaining to the movable asset;
   a monitoring unit configured to monitor an ambient radio frequency signal of the wireless wide area networks starting with a wireless wide area network channel responsive to the global location and to select the wireless wide area network channel based on an ambient radio frequency signal being above a threshold while the transceiver is powered off, wherein the monitoring unit is connectable to an antenna and includes a radio frequency splitter configured to split the ambient signal into multiple signal portions and filtering the portions individually by multiple filters; and
   the transceiver configured to:
   be powered up, upload the stored datum over the selected wireless wide area channel and when the upload is complete the transceiver is configured to be powered off in order to conserve battery power.

8. The device of claim 7, further comprising:
   a sensor configured to sense a status of the asset, wherein the sensor is selected from the group consisting of: a thermometer, a passive infra-red sensor, an intrusion detector, an accelerometer and a microphone, wherein the datum is a sensed datum provided by the sensor.

9. The device of claim 7, wherein the monitoring unit is connectable to an antenna and includes a frequency programmable radio frequency filter.

* * * * *